(12) United States Patent
Lee et al.

(10) Patent No.: US 8,197,147 B2
(45) Date of Patent: Jun. 12, 2012

(54) OPTICAL CONNECTION COMPONENT

(75) Inventors: Yong Tak Lee, Gwangju (KR); Kamal Alameh, Quinn Rocks (AU)

(73) Assignees: Edith Cowan University (AU); Ytel Photonics Inc. (KP)

( * ) Notice: Subject to any disclaimer, the term of this patent is extended or adjusted under 35 U.S.C. 154(b) by 470 days.

(21) Appl. No.: 12/440,916

(22) PCT Filed: Dec. 22, 2006

(86) PCT No.: PCT/AU2006/001992
§ 371 (c)(1),
(2), (4) Date: May 29, 2009

(87) PCT Pub. No.: WO2008/031136
PCT Pub. Date: Mar. 20, 2008

(65) Prior Publication Data
US 2010/0014806 A1    Jan. 21, 2010

(30) Foreign Application Priority Data

Sep. 13, 2006 (AU) ................................. 2006905043

(51) Int. Cl.
*G02B 6/36* (2006.01)
*G02B 6/42* (2006.01)
*H01S 5/026* (2006.01)
(52) U.S. Cl. ................ 385/93; 385/92; 385/88; 385/14; 385/31; 385/32; 385/15; 372/50.23
(58) Field of Classification Search .................... 385/14, 385/15, 31, 32, 33, 34, 88, 89, 92, 93, 94, 385/24, 129, 130, 131, 132; 398/135, 136, 398/137, 138, 139; 372/50.23
See application file for complete search history.

(56) References Cited

U.S. PATENT DOCUMENTS 5,978,401 A * 11/1999 Morgan ..................... 372/50.21
(Continued)

FOREIGN PATENT DOCUMENTS

AU    2009-900429    2/2009
(Continued)

OTHER PUBLICATIONS

Examination Report dated Aug. 4, 2010 and issued by the State Intellectual Property Office of the P.R.C. in China Patent Application No. 200680056182.8; 8 pages.

(Continued)

*Primary Examiner* — Brian Healy
(74) *Attorney, Agent, or Firm* — Ganz Law, P.C.

(57) ABSTRACT

The present invention provides an optical connection component which comprises a solid state laser component for emitting a modulated beam of light in response to an applied electrical signal. The optical connection component also comprises an optical lens positioned relative to the solid state laser component at a predetermined position in which the optical lens reduces divergence of the emitted beam of light. The optical lens is formed at the predetermined position in a manner such that the optical lens is immobile relative to the solid state laser component. The optical connection component further comprises an optical waveguide having a core for guiding the light. The optical waveguide has first and second end-portions. The first end-portion is positioned for coupling the modulated light from the optical lens into the core. In addition, the optical connection component comprises a receiver for receiving the modulated light from the second end-portion of the optical waveguide and arranged for converting the modulated light into a corresponding electrical signal.

27 Claims, 7 Drawing Sheets

U.S. PATENT DOCUMENTS

| | | | |
|---|---|---|---|
| 6,056,448 A | 5/2000 | Sauter et al. | 385/92 |
| 6,148,016 A | 11/2000 | Hegblom et al. | |
| 6,606,199 B2 * | 8/2003 | Wang | 359/652 |
| 6,782,027 B2 * | 8/2004 | Cox et al. | 372/50.1 |
| 6,798,953 B1 | 9/2004 | Cohen et al. | |
| 6,888,871 B1 | 5/2005 | Zhang et al. | 372/75 |
| 7,446,298 B1 * | 11/2008 | Stone | 250/216 |
| 2002/0025122 A1 | 2/2002 | Ouchi et al. | |
| 2004/0033025 A1 | 2/2004 | Richard et al. | |
| 2004/0037512 A1 | 2/2004 | Cho et al. | 385/88 |
| 2004/0264884 A1 | 12/2004 | Liu | 385/89 |
| 2005/0180700 A1 | 8/2005 | Farr | |
| 2007/0154222 A1 | 7/2007 | Kim et al. | |
| 2010/0014806 A1 * | 1/2010 | Lee et al. | 385/15 |

FOREIGN PATENT DOCUMENTS

| | | |
|---|---|---|
| CN | 1448000 | 10/2003 |
| EP | 063057 A2 | 12/1994 |
| EP | 0975072 | 1/2000 |
| GB | 2378069 | 1/2003 |
| KR | 1020040091224 | 10/2004 |
| KR | 102005114145 | 11/2005 |
| WO | 01/03255 | 1/2001 |
| WO | 02/093696 | 11/2002 |
| WO | 2010088728 | 8/2010 |

OTHER PUBLICATIONS

PCT International Search Report dated Mar. 20, 2007 for parent PCT International Patent application No. PCT/AU2006/001992, filed Dec. 22, 2006, 5 pages.

PCT International Search Report for International Application No. PCT/AU2010/000112, mailed on Mar. 18, 2010; (5 pages total).

Strzelecka, et al., "Monolithic Integration of Refractive Lenses with Vertical Cavity Lasers and Detectors for Optical Interconnections," Proc. SPIE, vol. 2691, pp. 43-53. 1996, (11 pages).

* cited by examiner

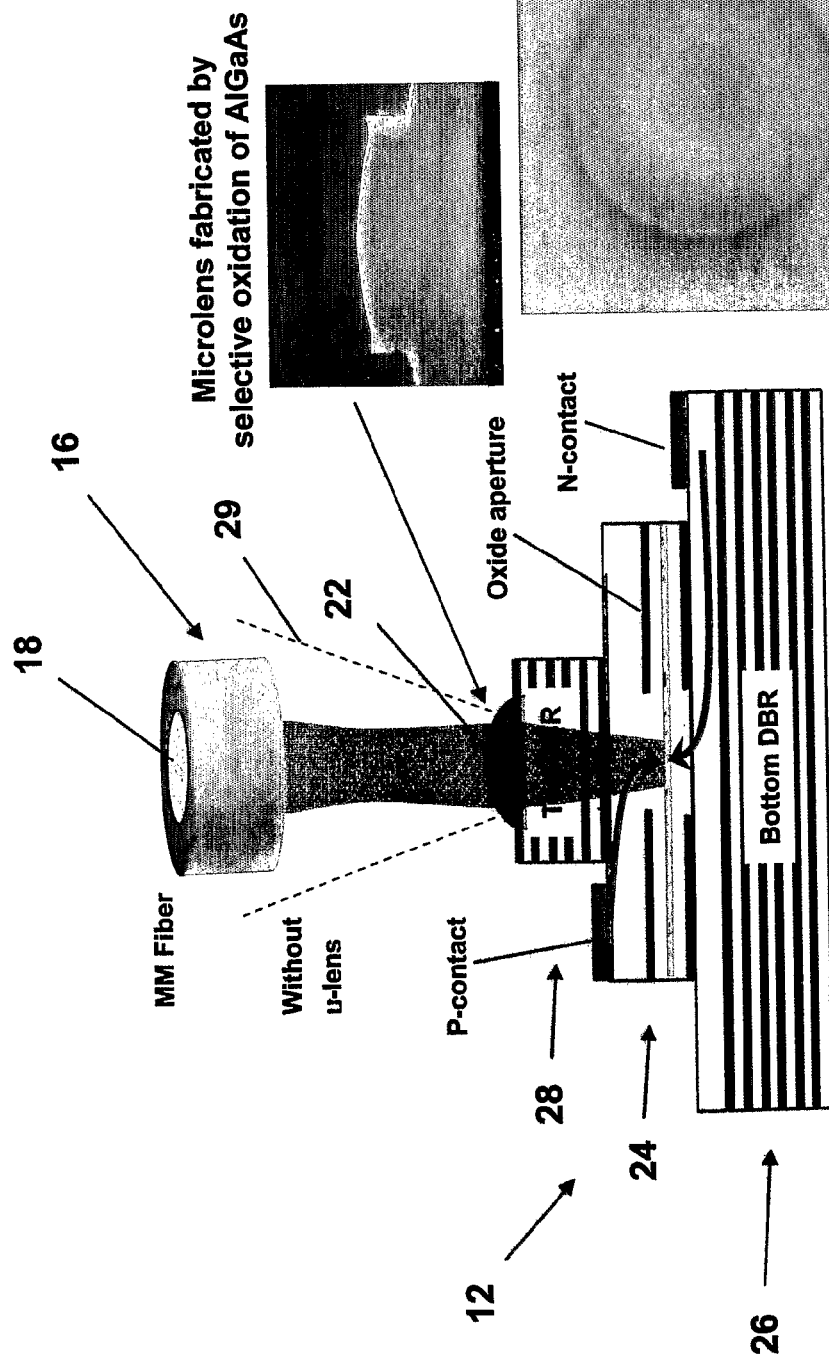
*Fig. 2 (a)*
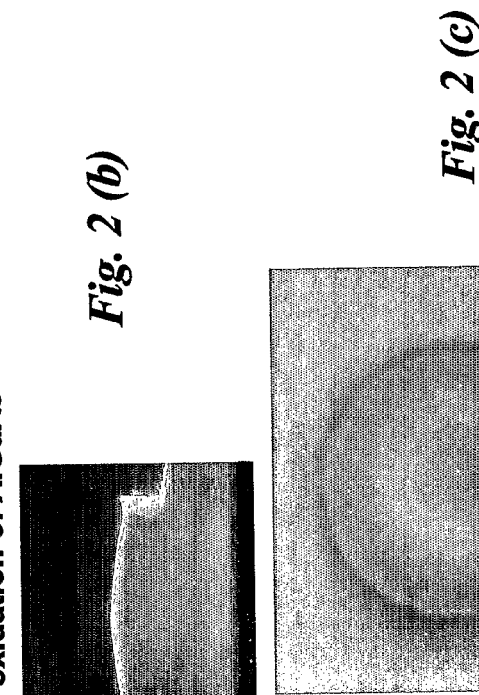
*Fig. 2 (b)* Microlens fabricated by selective oxidation of AlGaAs
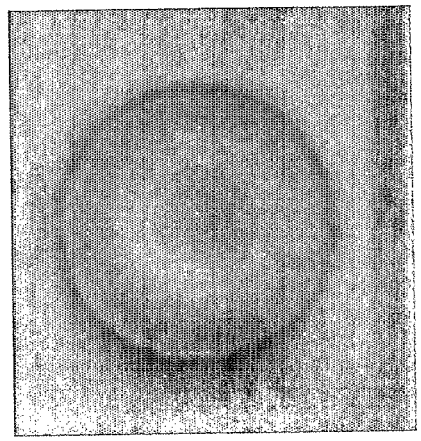
*Fig. 2 (c)* Microscope image after oxidation

OPTICAL CONNECTION COMPONENT

CROSS REFERENCE TO RELATED APPLICATIONS

This application is being filed under 35 U.S.C. 371 as a United States National Phase application of International Patent Application Number PCT/AU2006/001992, filed Dec. 22, 2006, which claims priority to Australian patent application number 2006905043, filed Sep. 13, 2006 all of which are hereby incorporated by reference as if listed in their entirety herein for all purposes.

FIELD OF THE INVENTION

The present invention broadly relates to an optical connection component. The present invention relates particularly, though not exclusively, to an optical connection system for transmission of data at a capacity of a few Gb/s or more.

BACKGROUND OF THE INVENTION

Today's large-scale multiprocessor computer systems include hundreds of CPUs and data storage devices having terabytes of memory. Data transmission between processors requires wide bandwidths and a data transmission speed of few Tb/s may be required by the end of this decade.

Presently electrical links are being used for establishing connections between chips. Electrical connections are reliable and it is possible to manufacture them in a cost efficient manner. However, electrical connects have fundamental physical limitations for high speed data transmission, which relate to electrical power requirements, transmission latency, achievable package density, etc.

Alternatively, data transmission between chips may be established using optical links, which have a number of advantages compared with electrical connections. Optical links may be used for high-speed data buses in computers and between signal processors such as those in mobile phones. The use of such "Optical Interconnects" (OI's) has also the added advantage that data transmission is not affected by electromagnetic interference.

Many OI structures have been proposed for high-speed data communication, including polymer waveguides, fibre image guides, fibre ribbons and free space optical connections using lenses and mirrors.

The use of high-speed optical fibre links for establishing chip-to-chip or "inter-chip" connections has the significant advantage that input and output platform size can be reduced to ~1/500 compared with that required for electric connections, the throughput density can be increased by a factor of ~1000, the power consumption can be reduced to ~1/4, and a data transmission speed exceeding 1 Tb/s is possible.

An OI incorporates an optical transmitter, an optical waveguide and an optical receiver. Key issues for designing OI's having a low Bit-Error Rate (BER) are transmission distance, properties of the optical waveguide such as dispersion, coupling losses, and properties of the optical source and receiver. However, for short optical links between chips losses of the optical waveguide and dispersion of guided light are negligible and consequently the remaining key-issues for the design of an OI are the properties of the source, the properties of the receiver and the coupling between them.

The optical source typically is provided in the form of a low-cost semiconductor laser, such as an edge-emitting laser or a vertical-cavity surface-emitting laser (VCSEL). A VCSEL typically is relatively compact and easy to integrate in one-dimensional or two-dimensional spaces, which is advantageous for small-scale designs that are required for high density parallel interconnects.

A laser beam emitted from a VCSEL typically has a circular intensity profile and initially a diameter of only a few μm. Even though the angle of divergence is relatively small (typically 10-15 degrees), a core of an optical fibre, into which emitted laser light may be coupled, needs to be positioned very close to the VCSEL in order to reduce coupling losses. Optical fibres with a core diameter of 62.5 μm (multimode) or 7-9 μm (single-mode) typically are used, and an end-face of the optical fibre needs to be positioned within ~100 μm of the VCSEL along the axis direction and within a few microns in in-plane directions to minimize coupling loss. Such precise positioning of the optical fibre is cumbersome and expensive.

In order to enable high speed data transmission, such as data transmission at a rate of 10 Gb/s or more, optical fibres with smaller core diameters need to be used. Such smaller core diameters reduce the tolerances in positioning the optical fibre even further, which results in a significant technological challenge.

SUMMARY OF THE INVENTION

The present invention provides in a first aspect an optical connection component, comprising:
  a solid state laser component for emitting a modulated beam of light in response to an applied electrical signal;
  an optical lens positioned relative to the solid state laser component at a predetermined position in which the optical lens reduces in use divergence of the emitted beam of light, the optical lens being formed at the predetermined position in a manner such that the optical lens is immobile relative to the solid state laser component;
  an optical waveguide having a core for guiding the light, the optical waveguide having first and second end-portions, the first end-portion being positioned for coupling the modulated light from the optical lens into the core; and
  a receiver for receiving the modulated light from the second end-portion of the optical waveguide and arranged for converting the modulated light into a corresponding electrical signal.

The optical connection component has significant practical advantages. Due to the optical lens, divergence of the beam of laser light is reduced and consequently the exact positioning of the optical waveguide, such as an optical fibre, is less critical. As a consequence, packaging tolerances are increased and the cost of manufacture is reduced. Further, as the optical lens is immobile relative to the solid state laser component and positioned at the predetermined position, adjustment of the lens is avoided which also reduces the cost of production.

The optical connection component may be arranged for transmission of data at a speed of more than 1 or 5 Gb/s and typically is arranged for transmission of data at a speed of more than 10 or 15 Gb/s.

The optical fibre may have a diameter of 10 μm-40 μm, typically approximately 30 μm. The optical fibre may be multi-mode or single-mode optical fibre.

The optical lens typically is arranged for reduction of the divergence of the emitted laser light in a manner such that substantially low-loss coupling of the emitted laser light into the core of the optical fibre is possible. For example, for a core diameter of 10 μm, 20 μm and 30 μm, the distance between the laser and the end portion of the optical fibre may be smaller than 100 μm, 200 μm, or 300 μm, respectively, to achieve lowest coupling loss if conventional solid state laser with beam divergence is used.

The optical lens typically is positioned and arranged so that in use the emitted laser light is substantially collimated by the optical lens.

The optical lens may be formed on a portion of the solid state laser component. In one embodiment of the present invention the optical lens and the solid state laser component are monolithically integrated, which further reduces cost of manufacture and facilitates reduction in size.

The solid state laser may be provided in any suitable form, but typically is a vertical-cavity surface-emitting laser (VCSEL). The solid state laser typically comprises first and second distributed Bragg reflectors (DBR). In one embodiment, the optical lens is formed on an exterior surface of one of the DBRs.

The VCSEL typically comprises an active region that is sandwiched between the first and the second DBR. The VCSEL typically has a first and a second electrical contact for applying an excitation current to the active region. The VCSEL typically is provided with a heat sink arranged to dissipate heat that is in use generated by an electrical current through the active region.

The receiver typically is a resonant cavity enhanced photodiode (RCE-PD), positive-intrinsic-negative (PIN) photodiode or an avalanche photodiode. The RCE-PD typically comprises an active region and first and second DBRs, which function as reflectors. The RCE-PD typically has a structure similar to that of the VCSEL, with a first and a second electrical contact for receiving a photocurrent at the active region in response to absorbed light. The RCE-PD typically is provided with a heat sink arranged to dissipate heat generated by the current through the active region of the RCE-PD.

A person skilled in the art will appreciate that a suitable solid state laser component may also function as a receiver generating an electrical signal in response to a received optical signal. In one embodiment the receiver is also provided in form of a solid state laser component such as a VCSEL. Either one of the solid state laser components may be arranged for operation as an emitter and the other solid state laser component is arranged for operation as a receiver with one mirror typically having a reduced number of DBR layers.

In one specific embodiment of the present invention the optical connection component further comprises a metallic substrate or layer on which at least one optical element, provided in the form of the solid state laser component or the receiver, is positioned.

For example, the or each optical element may be positioned directly on the metallic substrate or layer. Alternatively, the or each optical element may be positioned on a further layer, such as a layer of an adhesive material, that is positioned directly on the metallic substrate or layer.

An optical element, such as the VCSEL, develops heat during operation, which can influence the performance of the optical element. For example, heat development in a VCSEL can result in thermal drifting of the wavelength of emitted laser light. As in the above-described specific embodiment the or each optical element is positioned on a metallic layer or substrate, heating of the optical element can be reduced or avoided due to the typically very large thermal conductivity associated with metallic materials. This is particularly advantageous if a relative large current is required to compensate for possible coupling losses between a VCSEL and an optical fibre for enabling light intensities required for longer communication distances.

The metallic layer or substrate typically is a metallic substrate and may be composed of aluminium which has a thermal conductivity of approximately 230 W/mK.

The optical connection component typically also comprises an insulating layer adjacent at least one side portion of at least one optical element, which is provided in the form of the solid state laser component or the receiver. Further, the optical connection component typically comprises electrically conductive layer portions electrically connected to the, or a respective, optical element, the electrically conductive layer portions overlapping the insulating layer and extending away from the, or a respective, optical element so that electrical connection of the or each optical element can be achieved by contacting the electrical conductive layer portions at a location that is remote from the or each optical element.

For example, conventional wire bonding of an optical element, which may be a VCSEL provided in form of an integrated circuit element, typically results in the wires projection approximately 50-100 μm over a top surface of the VCSEL. Consequently, accurate positioning of optical fibres in the close proximity of the top surface the VCSEL (within a few 10 μm) is often very difficult or impossible. Alternatively, optical elements may be contacted from their underside which also has significant problems. Because the above-defined electrically conductive layer portions allow electrical connection of the or each optical element from a location that is remote from the or each optical element, these difficulties can be avoided.

The electrically insulating layer typically surrounds the or each optical element in a plane defined by the electrically insulating layer and typically comprises a polymeric portion adjacent the optical element and $Al_2O_3$ adjacent the polymeric portion. The $Al_2O_3$ typically is anodized.

The or each optical connection component typically also comprises an optically transparent layer covering at least a portion of the or each optical element or covering an outer surface of the or each optical element entirely. The optically transparent layer typically is a polymeric layer and is planarized.

The or each optical element typically is entirely enclosed by the above-defined layers which results in packaging advantages and protects the or each optical element.

The optical element of the optical connection component according to the above-described specific embodiment typically is one of a plurality of optical elements.

The present invention provides in a second aspect an optical connection system comprising a plurality of the above-described optical connection components arranged for parallel transmission of data.

The first solid state laser components typically are arranged in an array. Further, the receivers, which may be provided in the form of the second solid state lasers, typically are arranged in an array. The system typically also comprises an electronic component for driving the solid state laser components and at least one electronic component for driving the receivers. The array of solid state laser components and the driver for driving the array of solid state laser components typically are integrated components and typically are positioned on a first circuit board. The array of receivers and the electronic component for driving the array of the receivers typically are also integrated components and may be positioned on the first circuit board or on a separate second circuit board.

In an alternative embodiment the solid state laser components comprise first and second groups of solid state laser components and the receivers comprise first and second groups of receivers. The first group of the solid state laser components may be positioned adjacent the first group of the receivers and a second group of the solid state laser components may be positioned adjacent a second group of the receivers typically in a monolithically integrated manner, respectively. The first group of the solid state laser components typically is coupled to the second group of the receivers by optical fibres and the second group of the solid state laser components typically is coupled to the first group of the receivers by optical fibres so that bi-directional transmission of is possible between the first and the second groups.

The first group of solid state lasers and the first group of receivers typically are monolithically integrated in a first array. The second group of solid state lasers and the second group of receivers typically are monolithically integrated in a second array.

The above-described system according to the second aspect of the present invention and also the optical connection component according to the first aspect of the present invention typically comprise first and second mechanical connection elements. The first mechanical connection element typically is arranged for holding the first end-portion of the or each optical fibre in at least one first predetermined position relative to the first mechanical connection element and the second mechanical connection element typically is arranged for holding the second end-portion of the or each optical fibre in at least one second predetermined position relative to the second mechanical connection element. The or each first predetermined position typically is selected so that light can be coupled from the or each solid state laser components into the core of the or each optical fibre to minimize substantially the coupling losses. The or each second predetermined position typically is selected so that light can be coupled from the core of the optical fibres into the or each receiver to minimize substantially the coupling losses.

The first and second mechanical connection elements typically are each arranged for bending the or each optical fibre at any angle such as approximately 90°.

The or each solid state laser and the or each receivers typically are positioned on at least one circuit board. The first and second mechanical connection elements typically have first and second guiding pins and the or each circuit board typically has corresponding first and second apertures for receiving respective guiding pins. The first guiding pins and the first apertures typically are positioned so that the first end-portion of the or each optical fibre is positioned in the or each first predetermined position when the first guiding pins are received by the first apertures. The second guiding pins and the second apertures typically are positioned so that the second end-portion of the or each optical fibre is positioned in the or each second predetermined position when the second guiding pins are received by the second apertures. Consequently, the first and second mechanical connection elements are arranged so that the end-portions of the optical fibres are substantially passively-aligned.

The present invention provides in a third aspect an electronic board comprising electronic components which are linked by the above-described optical connection component or optical connection system.

The present invention provides in a fourth aspect a computer bus comprising the above-described optical connection system.

The computer bus may be arranged for connecting more than two electronic elements. For example, one of the electronic elements may be a switching hub and the computer bus may be arranged for connecting the switching hub with the or each other electronic components.

The present invention provides in a fifth aspect a computer system comprising electronic components which are linked by the above-described optical connection component or optical connection system.

The present invention provides in a sixth aspect a method of linking electronic components for enabling data transmission between the electronic components, the method comprising:
  providing a first electronic component;
  providing a second electronic component; and
  interconnecting the first and second electrical components using the above described interconnection component according to the first aspect of the present invention or the above-described interconnection system according to the second aspect of the present invention.

The present invention provides in a sixth aspect an electronic circuitry comprising at least one optical element, the or each optical element having electric contacts and the electronic circuitry further comprising:
  a metallic substrate or layer on which the or each optical element is positioned,
  an insulating layer positioned over portions of the metallic substrate and adjacent at least one side portion of the or each optical element;
  electrically conductive layer portions electrically connected to the, or a respective, optical element, the electrically conductive layer portions overlapping the insulating layer and extending away from the, or a respective, optical element so that electrical connection of the or each optical element can be achieved by contacting the electrical conductive layer portions at a location that is remote from the or each optical element.

The or each optical element may be positioned directly on the metallic substrate or layer or the or each optical element and the metallic substrate or layer may be separated by a further layer such as a layer of an adhesive material.

The present invention provides in a seventh aspect a solid state laser component for emitting a modulated beam of light in response to an applied electrical signal;
  an optical lens positioned relative to the solid state laser component at a position in which the optical lens reduces in use divergence of the emitted beam of light, the optical lens being formed on a portion of the solid state laser component and at the predetermined position in a manner such that the optical lens is immobile relative to the solid state laser component;
  an optical fibre having a core, the optical fibre having first and second end-portions, the first end-portion being positioned for coupling the modulated light from the optical lens into the core;
  a receiver for receiving the modulated light from the second end-portion of the optical fibre and arranged for converting the modulated light into a corresponding electrical signal;
  at least one circuit board having first and second apertures; and
  first and second mechanical connection elements which are movable relative to the at least one circuit board, the first mechanical connection element being arranged for holding the first end-portion of the optical fibre in a first predetermined position and the second mechanical connection element being arranged for holding the second end-portion of the optical fibre in a second predetermined position, the first and second mechanical connection elements having first and second guiding pins, respectively, which are arranged for being received by the first and second apertures, respectively, of the at least one circuit board;

wherein the first guiding pin and the first aperture are positioned so that the first end-portion of the optical fibre is positioned in the first predetermined position when the first guiding pin is received by the first aperture and wherein the second guiding pin and the second aperture are positioned so that the second end-portion of the optical fibre is positioned in the second predetermined position when the second guiding pin is received by the second aperture, and wherein the first predetermined position is selected so that the modulated light can be coupled from the solid state laser component into the optical fibre without substantial coupling losses and the second predetermined positions is selected so that the modulated light can be coupled from the optical fibre into the receiver without substantial coupling losses.

The present invention provides in an eight aspect a high speed optical connection component, comprising:

a solid state laser component for emitting a modulated beam of light in response to an applied electrical signal;

an optical lens positioned relative to the solid state laser component at a predetermined position in which the optical lens reduces in use divergence of the emitted beam of light, the optical lens being formed on a portion of the solid state laser component and at the predetermined position in a manner such that the optical lens is immobile relative to the solid state laser component;

an optical waveguide having a core for guiding the light, the optical waveguide having first and second end-portions, the first end-portion being positioned for coupling the modulated light from the optical lens into the core;

a receiver for receiving the modulated light from the second end-portion of the optical waveguide and arranged for converting the modulated light into a corresponding electrical signal; and a metallic substrate or layer on or over which the solid state laser component is positioned.

The present invention provides in a tenth aspect a high speed optical connection component, comprising:

a solid state laser component for emitting a modulated beam of light in response to an applied electrical signal;

an optical lens positioned relative to the solid state laser component at a predetermined position in which the optical lens reduces in use divergence of the emitted beam of light, the optical lens being formed on a portion of the solid state laser component and at the predetermined position in a manner such that the optical lens is immobile relative to the solid state laser component;

an optical waveguide having a core for guiding the light, the optical waveguide having first and second end-portions, the first end-portion being positioned for coupling the modulated light from the optical lens into the core;

a receiver for receiving the modulated light from the second end-portion of the optical waveguide and arranged for converting the modulated light into a corresponding electrical signal;

an insulating layer adjacent at least one side portion of the solid state laser component; and electrically conductive layer portions electrically connected to the solid state laser component, the electrically conductive layer portions overlapping the insulating layer and extending away from the solid state laser component so that electrical connection of solid state laser component can be achieved by contacting the electrical conductive layer portions at a location that is remote from solid state laser component.

The invention will be more fully understood from the following description of embodiments of the invention. The description is provided with reference to the accompanying drawings.

BRIEF DESCRIPTION OF THE DRAWINGS

FIG. 2(a)-(c) show elements of the optical connection component.

DETAILED DESCRIPTION OF EMBODIMENTS

Figure 1:
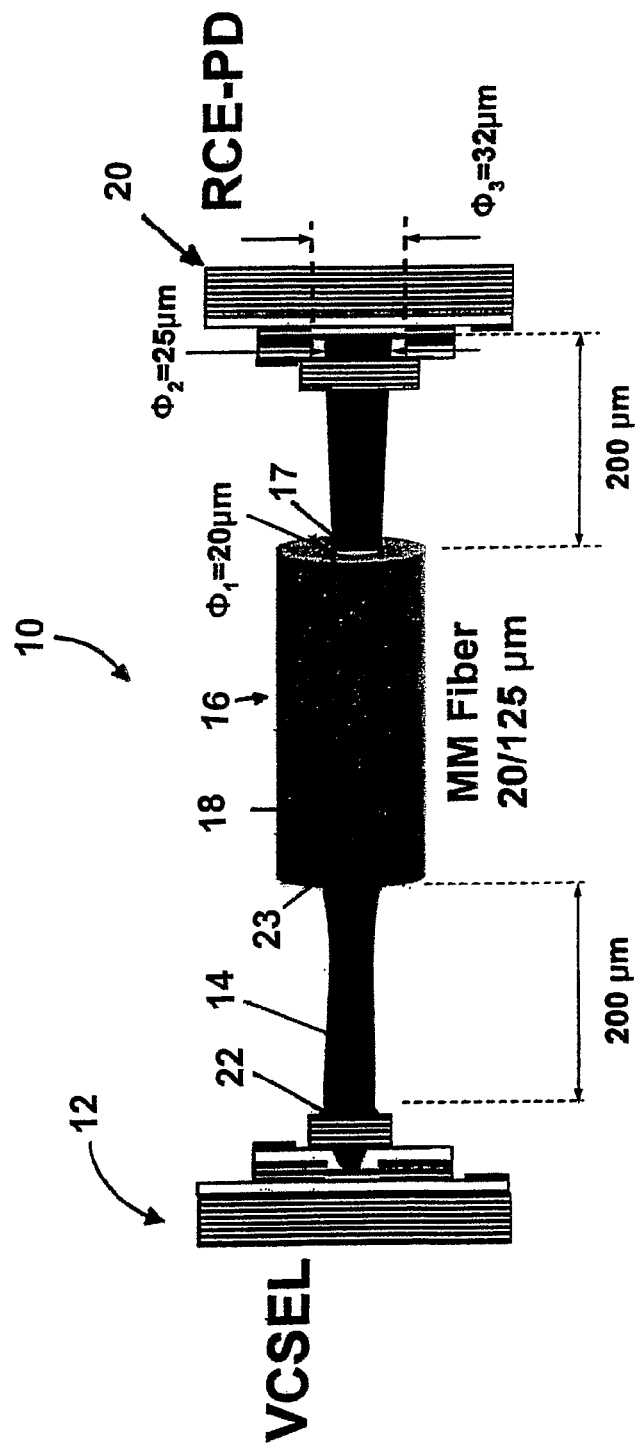
FIG. 1 shows an optical connection component according to a specific embodiment of the present invention.

Referring initially to FIG. 1, an optical connection component according to a specific embodiment of the present invention is now described. The optical connection component 10 comprises a solid state laser component, which is in this embodiment provided in the form of a vertical cavity surface emitting laser (VCSEL) 12. The VCSEL 12 emits laser light 14, which is coupled into an optical fibre 16. The optical fibre 16 guides the emitted light in a core 18. The guided light is emitted from an end-portion 17 of the optical fibre 16 and directed to a receiver, which is in this embodiment provided in the form of a resonant cavity enhanced photo diode (RCE-PD) 20.

The optical connection component 10 comprises input terminals (not shown) to which an electrical signal is applied and which are connected to the VCSEL 12 so that the emitted laser beam 14 is modulated by the electrical signal. The high frequency electrical signal is in this example associated with transmission of data at a speed of 10 Gb/s. In variations of this embodiment the optical connection system may be arranged for data transmission at lower speeds or higher speeds such as 15 Gb/s or even 40 Gb/s.

The RCE-PD 20 is arranged to receive the modulated light and convert the modulated light into a corresponding electrical signal which is applied to output terminals (not shown).

For example, the optical connection component 10 may provide a high speed data transmission link between electronic components such as integrated circuit elements. Such an optical "interconnect" has applications for high speed computers or any other electronic systems that benefit from data transmission at high speed.

The VCSEL 12 typically emits a laser beam 14 that has a probe diameter of only a few m at a surface from which the laser beam is emitted. The VCSEL laser beam typically has a divergence of 10-15°. Even though this divergence is relatively small, the probe diameter quickly increases to a diameter that is larger than that of the fibre core 18. However, the optical connection component 10 comprises a lens 22 which reduces that problem as the lens 22 reduces divergence of light beam 14. This has the particular advantage that the exact positioning of the optical fibre end-portion 23 relative to a light emitting surface of the VCSEL 12 is less critical. In this embodiment the optical lens 22 is positioned so that the emitted laser light 14 is substantially collimated. Even though the collimation may not be perfect, the collimating function of the optical lens 22 increases packing tolerances substantially which facilitates the industrial fabrication of the high speed optical connection component 10.

In this embodiment, the fibre core 18 has a diameter of approximately 20 μm and the optical fibre 16 is positioned at a distance of approximately 200 μm from the lens 22 to avoid touching the bonding wires of VCSELs. This is a relatively large distance and shows the increased allowable package tolerances. In this embodiment the distance between the lens 22 and the optical fibre 16 may range from 0 to 200 μm or more.

The light emitted from the core 18 of the optical fibre 16 diverts to a diameter of approximately only 25 μm and is received by a receiving surface of the RCE-PD 20. The receiving surface of the RCE-PD 20 typically is positioned approximately 200 μm from an end-face of the optical fibre 16.

Parallel transmission at high speed is possible by coupling a plurality of the optical connection components 10 in parallel. For example, such a system for parallel transmission of data may comprise an array of the VCSELs 12, an array of the RCE-PDs 20 and a plurality of optical fibres 16 connecting the solid state lasers 12 with respective RCE-PDs 20. In one specific variation a first group of VCSELs 12 and a first group of RCE-PDs 20 are positioned at respective first ends of the optical fibres. A second group of RCE-PDs 20 and second group of VCSELs 12 are positioned at respective second ends of the optical fibres 16 so that bi-directional communication is possible (between the VCSELs of the first group and the RCE-PDs of the second group in a first direction and between the VCSELs of the second group and the RCE-PDs of the first group in a reverse direction). The groups of VCSELs and REC-PDs at either end of the established communication link are monolithically integrated and form arrays.

It is to be appreciated that in alternative embodiments of the present invention the optical fibre core 18 may have other diameters, such as 25 or 30 μm. Further, the optical connection system 10 may not necessarily comprise a VCSEL, but may alternatively comprise another type of solid state laser, such as an edge-emitting laser. In addition, the receiver may not necessarily be provided in the form of the RCE-PD 20, but may be provided in any other suitable form, such as in the form of a positive-intrinsic-negative photodiode (PIN-PD) or an avalanche photodiode (APD).

In one specific variation of the above-described embodiment the receiver is also provided in the form of a RCE-PD. In this case the receiving RCE-PD generates an electrical signal in response to a received modulated optical signal. In this embodiment the receiving RCE-PD is not coupled to a lens such as the lens 22 as the probe diameter of the beam of light emitted form the end-face 17 of the optical fibre is sufficiently small for coupling the light into the receiving RCE-PD to minimize substantially coupling losses.

It is to be appreciated that in a variation of this embodiment each optical connection component may be arranged for communication a bi-directional manner. Either one of the VCSELs may be used for generating an optical signal in response to an applied forward electrical signal and the other VCSEL with reverse bias may function as a receiver. In one specific variation both VCSELs have lenses, such as lens 22, positioned at the emitting or the receiving faces of the VCSELs.

FIG. 2(*a*) shows the VCSEL 12, the lens 22 and the optical fibre 18 with optical fibre core 16 in more detail. The VCSEL 12 comprises a layered structure including AlGaAs, InGaAs and GaAs layers. An active central region 24 is sandwiched by distributed Bragg reflectors 26 and 28. The bottom distributed Bragg reflector (DBR) 26 reflects nearly 100% of the light generated in the active region 24 while the top DBR 28 reflects only approximately 98% of the generated laser light which results in emission of some of the laser light at a top end-face of the VCSEL 12. Dashed lines 29 schematically indicate a divergence that an emitted laser beam would have without the lens 22.

The fabrication of the optical lens 22, positioned on the top-face of the VCSEL 12, is now described. A digital alloy of AlxGa1-xAs is formed on the layered structure (the "bottom layered structure") associated with the VCSEL 12. The digital alloy comprises a further layered structure (the "top layered structure") including AlAs and GaAs thin layers having layer thickness ranging from 2-90 monolayers. The AlAs and GaAs layers are deposited using molecular beam epitaxy (MBE) or metal organic chemical vapour deposition (MOCVD). The top layered structure is capped with a GaAs layer having a thickness of approximately 100 nm. Conventional etching techniques are used to shape the two-dimensional extension of the top layered structure and one etching procedure may be used to shape the top layered structure and the bottom layered structure together. The top layered structure is then annealed in oxygen environment so that some of the aluminium contained in the AlAs layers of the AlAs/GaAs digital alloy oxidizes. The GaAs capping layer acts as a vertical oxygen diffusion barrier and more aluminium in the AlAs oxidizes at exposed side-portions of the etched top layered structure, which results in a convexly shaped region including mainly non-oxidized aluminium on the top-face of the VCSEL 12. The oxidation outside that region reduces the refractive index of the digital alloy and consequently the convexly shaped region has the focusing function of a lens for light that is emitted by the VCSEL 12. The oxidized aluminium over the convexly-shaped region and the GaAs capping layer may be removed using suitable etching procedures so that the lens 22 having a substantially spherical outer surface is formed.

FIGS. 2(*b*) and 2(*c*) show scanning electron micrographs of a formed lens 22.

Figure 3:
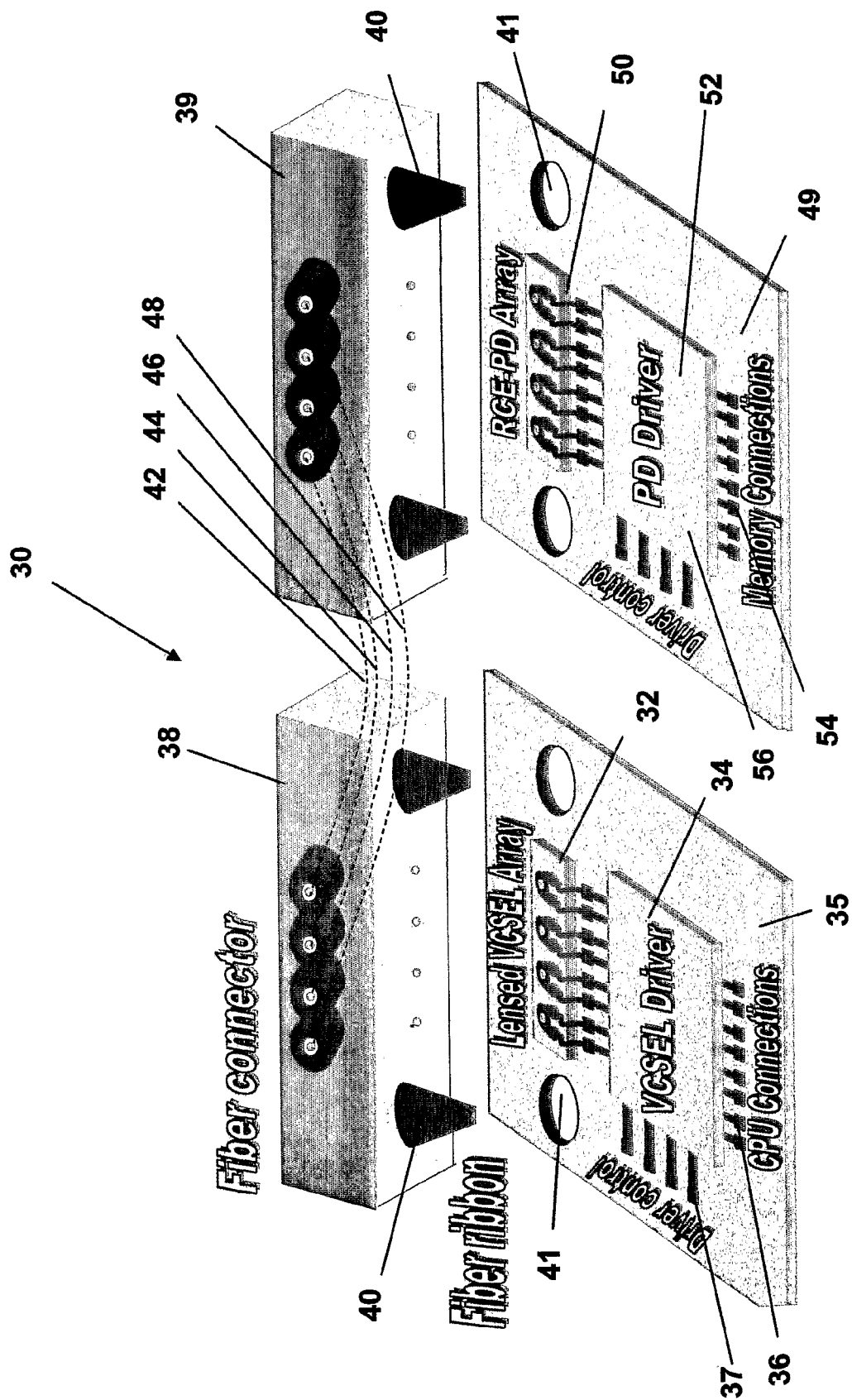
FIG. 3 shows an optical connection system according to another specific embodiment of the present invention, a FIG. 4 schematically shows computer system components linked by optical connection systems according to another embodiment of the present invention.

Referring now to FIG. 3, an optical connection system 30 for parallel transmission of data is now described. The system 30 comprises in this embodiment an array 32 comprising four VCSELs with optical lenses. Each VCSEL is provided in the form of the VCSEL 12 shown in FIG. 1 and described above. Each lens is positioned on an end-face of the VCSEL and is of the type of the lens 22 shown in FIG. 1 and described above. The VCSEL array 32 is driven by VCSEL driver component 34, which is controlled by driver control connected at connections 37. The VCSEL driver component 34 is in this embodiment also arranged for connection to a data source such as CPU via connections 36 from which input signals are directed to the VCSEL driver component 34. In this embodiment VCSEL array 32 is formed in an integrated manner and the VCSEL driver component 34 is also an integrated element. The VCSEL array 32 and the VCSEL driver component 34 are positioned on circuit board 35.

The connection system 30 comprises a mechanical connection element 38 that is arranged to hold first end-portions of optical fibres 42, 44, 46 and 48 in respective predetermined positions. The mechanical connection element 38 comprises pins 40 which are arranged for insertion into apertures 41 in a manner such that the first end-portions of the optical fibres 42, 44, 46 and 48 are positioned in respective positions in which light emitted from the VCSELs of the array 32 is directed into the optical fibres 42, 44, 46 and 48 without substantial losses when the mechanical connection element 38 is engaged with the circuit board 35.

The optical connection system 30 also comprises a mechanical connection element 39 which holds second end-portions of the optical fibres 42, 44, 46 and 48 in a predetermined position. In this embodiment, the mechanical connection elements 38 and 39 bend the optical fibres 42, 44, 46 and 48 by an angle of 90°.

The optical connection system 30 further comprises a second circuit board 49 on which an array 50 of four RCE-PD's is positioned. Each RCE-PD of the array 50 is of the same type as RCE-PD 20 shown in FIG. 1 and described above. Further, a photo diode (PD) driver component 52 is positioned on the board 49 for driving the RCE-PD array 50. The circuit board 49 also comprises connections 56 for connecting the PD driver 52 to a driver control unit (not shown).

For example, the PD driver component 52 may be arranged for connection to a computer memory (not shown) via memory connections 54. When the connection element 39 is positioned on the circuit board 49 in a manner such that pins 40 are received by apertures 41, second end-portions of the optical fibres 42, 44, 46 and 48 are positioned over the RCE-PDs of the array 50 so that light can be coupled from the second end-portions of the fibres into respective RCE-PD of the array 50 without substantial coupling losses.

It is to be appreciated that in variations of the embodiment shown in FIG. 3 and described above, the drivers, VCSEL arrays and RCE-PD arrays may be positioned on a the same board. Further, VCSELs may be positioned at both ends of the optical fibres in which case a bi-directional optical connection can be established.

Alternatively, the arrays 32 and 50 may both comprise VCSELs and RCE-PDs which would also enable bidirectional transmission of data. In this case each array typically comprise the same number of VCSELs and RCE-PDs.

Figure 4:
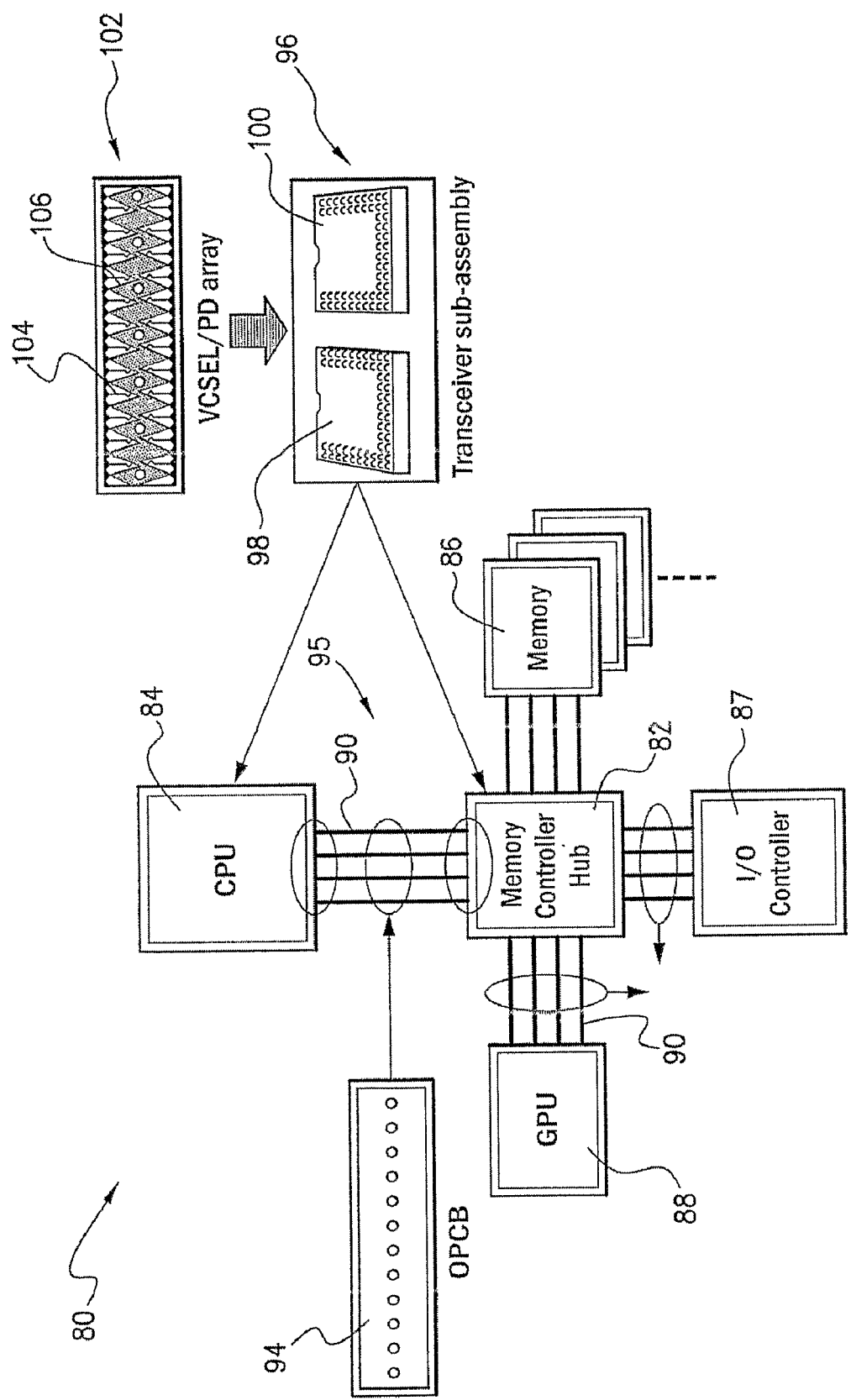

FIG. 4 shows an example of a diagram 80 of computer components including a computer bus 95. In this embodiment, Memory Controller Hub 82 is linked with CPU 84, memory 86, GPU 88 and I/O controller 87 by the computer bus 95 in the form of a plurality of optical connection systems 90 which are of the same type as the optical connection system 30 shown in FIG. 3 and described above, but comprises 12 parallel lines. Insert 94 shows an end-face of that mechanical connection components and end-faces of the 12 optical fibres. Insert 96 shows photographs of the VCSEL array 98 and RCE-PD array 100. Insert 102 shows a top-portion of the VCSEL array with electrical contacts 104 and optical lenses 106.

The computer bus 95 transports data between the CPU 90, GPU 88, memory 86 and I/O Controller Hub 87 via the Memory Controller Hub 82, which directs data traffic between respective source and destination. The Memory Controller Hub 82 operates by either repeating an incoming signal (for example from the CPU 84) to the other electronic components (For example memory 86, GPU 88 and I/O Controller Hub 87) or switches the incoming signals to appropriate electronic component according to address information in the transmitted data. Each optical connection system 90 allows parallel data transfer between these components at rate of 120 Gb/s (inclusive of checksum/error correction bits) where each optical connection of the 12 parallel lines is transferring at 10 Gb/s.

Figure 5:
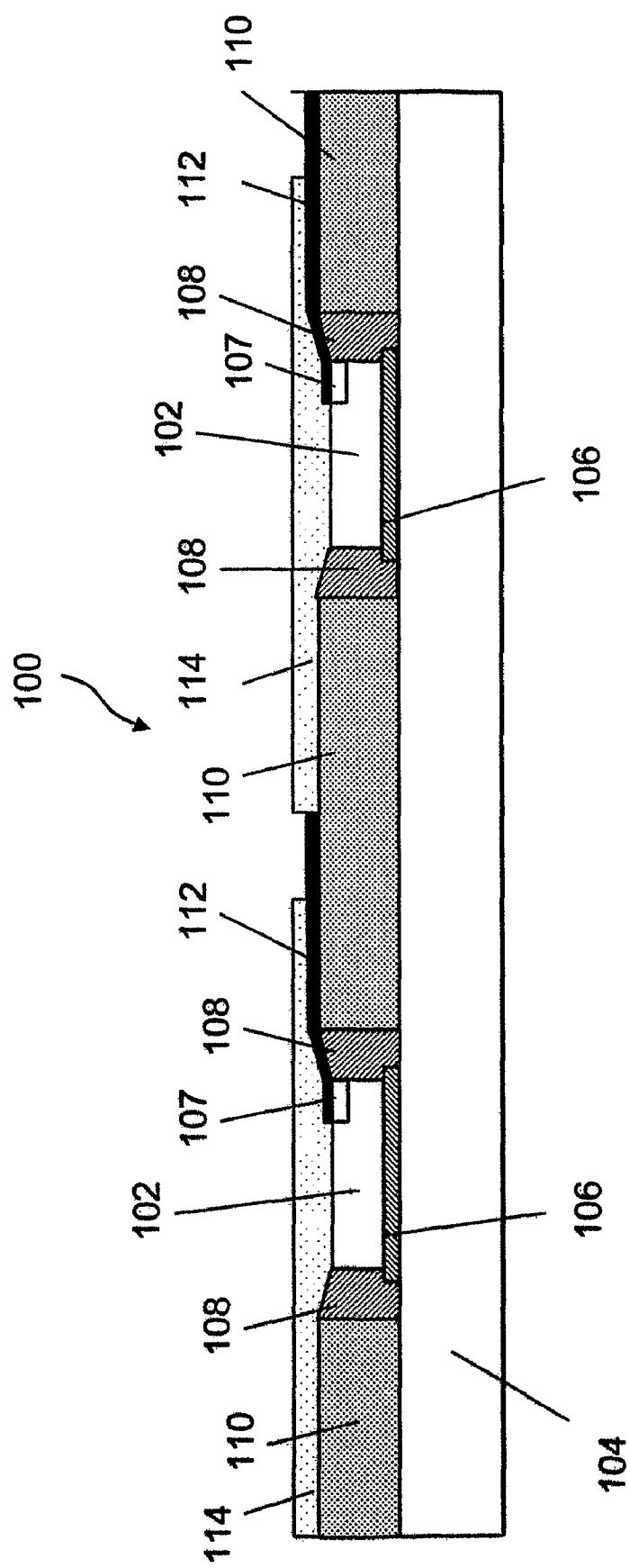
FIG. 5 shows a cross-sectional view of an optical connection component according to an embodiment of the present invention.
Figure 6:
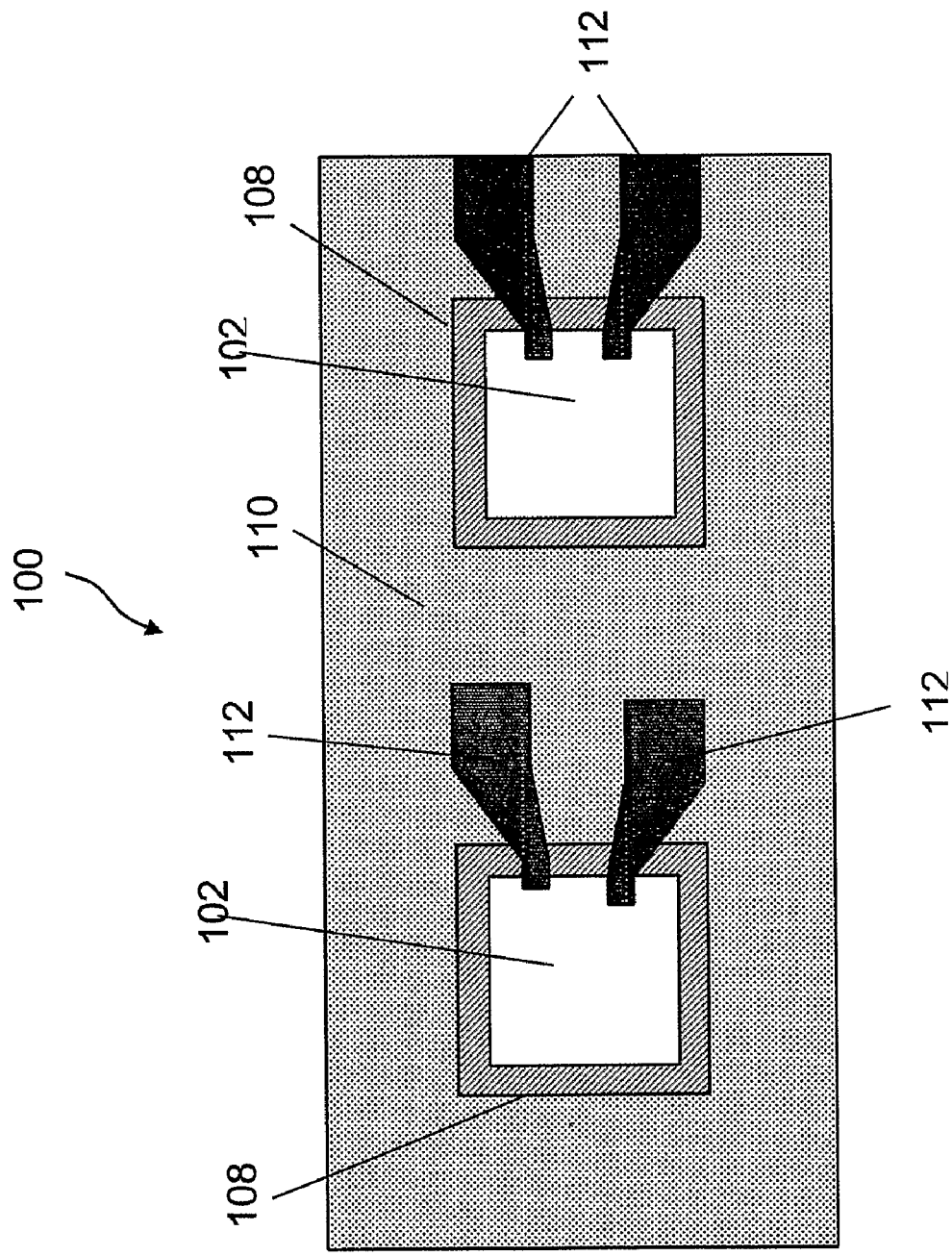
FIGS. 6 and 7 show top views of an optical connection component according to embodiments of the present invention.
Figure 7:
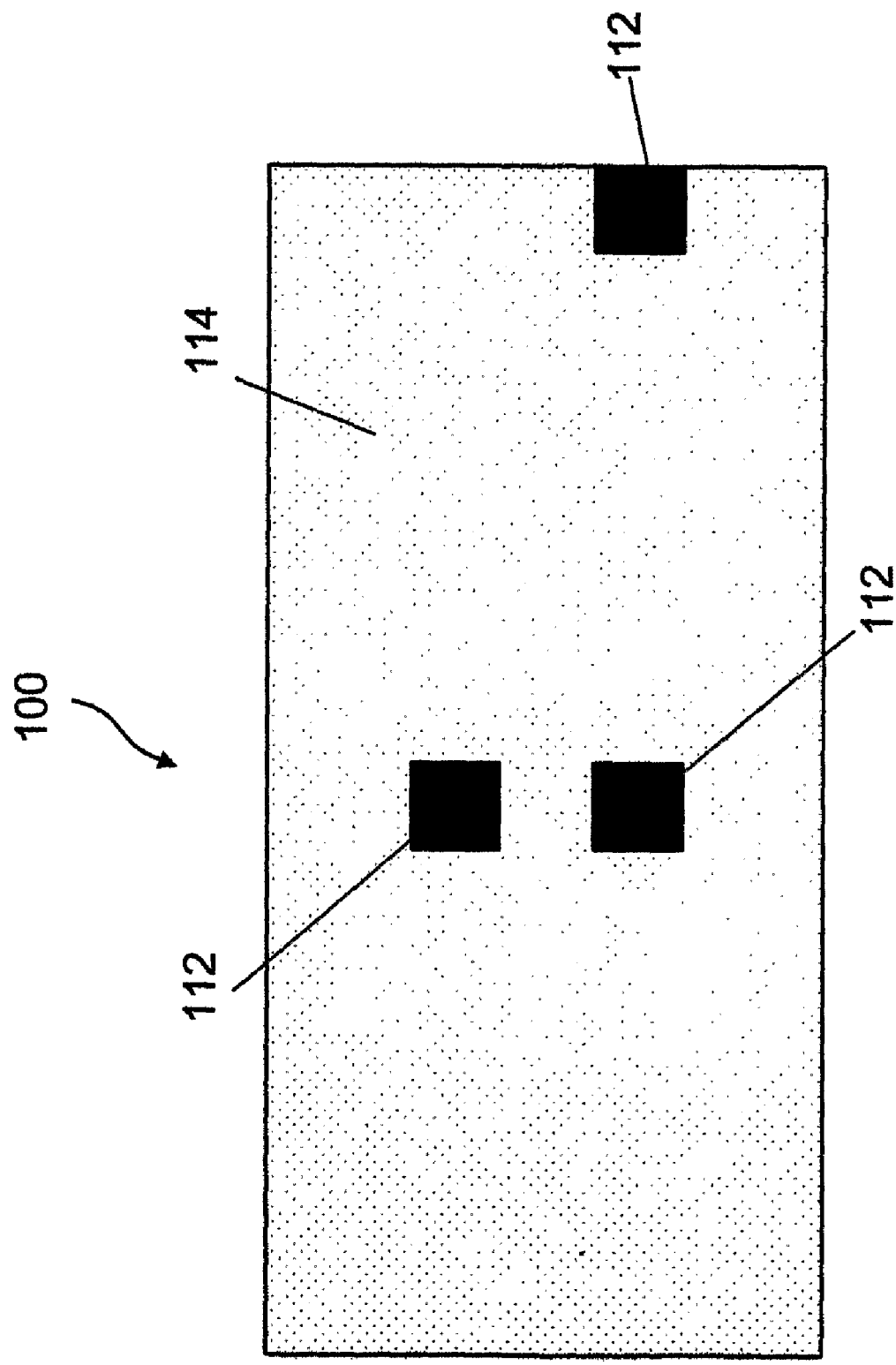

Referring now to FIGS. 5 to 7, elements of the optical connection components according to specific embodiments are now described. An electronic circuitry 100 shown in FIG. 5 to 7 comprises optical elements 102, which may be provided in the form of VCSELs 12 or RCE-PDs 20 shown in FIGS. 1 and 2. In variations for the described specific embodiments the electronic circuitry 100 may for example form the VCSEL array 32 or the RCE-PD array 50 shown in FIG. 3 and described above.

The optical elements 102 are positioned on an aluminium substrate 104, which facilitates conduction of developed heat. For example, the optical elements 102 may be attached to the substrate 104 by die bonding or using suitable adhesives 106, which advantageously also have a relatively high thermal conductivity.

The electronic circuitry 100 comprises polymeric portions 108 that surround the optical elements 102. The polymeric portions 108 are surrounded by an insulating layer 110 which in this embodiment is provided in form of anodised $Al_2O_3$. Contact portions 112 of aluminium are evaporated on electrical contacts 107 of the optical elements 102 and on portions of the polymeric material 108 and the insulating layer 110. A transparent polymeric layer 114 is then deposited on the optical elements 102, the insulating layer 110, the polymeric material 108 and portions of the contacts 112 so that only remote areas of the contacts of 112 are exposed. FIG. 6 shows the electronic circuitry 100 prior to deposition of the polymeric layer 114 and FIG. 7 shows the electronic circuitry 100 after deposition of the polymeric layer 114.

The electronic circuitry 100 has significant practical advantages as wires for electrical connection can be positioned remote from the optical elements 102 and consequently do not complicate or inhibit exact positioning of optical fibres over the optical elements 102. Further, developed heat can be conducted in the aluminium substrate away from the optical elements 102 and packaging is also facilitated.

The fabrication of the electronic circuitry 100 comprises etching, patterning and deposition techniques which are known in semiconductor industry.

Although the invention has been described with reference to particular examples, it will be appreciated by those skilled in the art that the invention may be embodied in many other forms. For example, any one of the links between computer components, positioned on the same electronic board or on different boards, may be provided in the form of an optical connection component or system.

The invention claimed is:

1. A high speed optical connection component, comprising:
    a solid state laser component for emitting a modulated beam of light in response to an applied electrical signal;
    an optical lens positioned relative to the solid state laser component at a predetermined position in which the optical lens reduces in use divergence of the emitted beam of light, the optical lens being formed on a portion of the solid state laser component and at the predetermined position in a manner such that the optical lens is immobile relative to the solid state laser component;
    an optical waveguide having a core for guiding the light, the optical waveguide having first and second end-portions, the first end-portion being positioned for coupling the modulated light from the optical lens into the core;
    a receiver for receiving the modulated light from the second end-portion of the optical waveguide and arranged for converting the modulated light into a corresponding electrical signal; and
    wherein the optical lens is arranged for reduction of divergence of the emitted laser light in a manner such that substantially low-loss coupling of the emitted laser light into the core of the optical waveguide is possible if the first end-portion of the optical waveguide is positioned within a distance from the optical lens, the distance being larger than at least twice the diameter of the core of the optical waveguide.

2. The optical connection component of claim 1 wherein the optical lens and the solid state laser component are monolithically integrated.

3. The optical connection component of claim 1 being arranged for transmission of data at a speed of more than 10 Gb/s.

4. The optical connection component of claim 1 wherein the optical waveguide is an optical fibre.

5. The optical connection component of claim 1 wherein the core diameter is 30 µm or less and the distance is at least 100 µm.

6. The optical connection component of claim 1 wherein the optical lens is positioned and arranged so that in use the emitted laser light is substantially collimated by the optical lens.

7. The optical connection component of claim 1 wherein the solid state laser is a vertical-cavity surface-emitting laser (VCSEL) and wherein the receiver is a resonant cavity enhanced photodiode (RCE-PD).

8. The optical connection component of claim 1 wherein the solid state laser comprises a distributed Bragg reflector (DBR) and the optical lens is formed on an exterior surface of the DBR.

9. The optical connection component of claim 1 wherein the waveguide is an optical fibre, the optical connection component comprising a first and a second mechanical connection element, the first mechanical connection element being arranged for holding a first end-portion of the optical fibre in first predetermined position relative to the first mechanical connection element and the second mechanical connection element being arranged for holding a second end-portion of the optical fibre in second predetermined position relative to the second mechanical connection element,
wherein the first predetermined position is selected so that light can be coupled from the solid state laser component into the core of the optical fibre without substantial coupling losses and the second predetermined position is selected so that light can be coupled from the core of the optical fibre into the receivers without substantial coupling losses.

10. The optical connection component as claimed in claim 1 further comprising a metallic substrate or layer on which at least one optical element, provided in the form of the solid state laser component or the receiver, is positioned.

11. The optical connection component as claimed in claim 1 further comprising:
an insulating layer adjacent at least one side portion of at least one optical element which is provided in the form of the solid state laser component or the receiver; and
electrically conductive layer portions electrically connected to the, or a respective, optical element, the electrically conductive layer portions overlapping the insulating layer and extending away from the, or a respective, optical element so that electrical connection of the or each optical element can be achieved by contacting the electrical conductive layer portions at a location that is remote from the or each optical element.

12. An optical connection system comprising a plurality of the optical connection components as claimed in claim 1 and being arranged for parallel transmission of data and wherein the solid state laser components and the receivers are arranged in arrays.

13. The optical connection system of claim 12 wherein the solid state laser components comprise first and second groups of solid state laser components and the receivers comprise first and second groups of receivers, the first group of the solid state laser components being positioned adjacent the first group of the receivers and a second group of the solid state laser components being positioned adjacent a second group of the receivers.

14. The system of any one of claim 13 wherein the waveguides are optical fibres, the system comprising first and second mechanical connection elements, the first mechanical connection elements being arranged for holding the first end-portions of the optical fibres in first predetermined positions relative to the first mechanical connection elements and the second mechanical connection elements being arranged for holding the second end-portions of the optical fibres in second predetermined positions relative to the second mechanical connection elements,
wherein the first predetermined positions are selected so that light can be coupled from the solid state laser components into the cores of the optical fibres without substantial coupling losses and the second predetermined positions are selected so that light can be coupled from the cores of the optical fibres into the receivers without substantial coupling losses.

15. The system of claim 14 wherein the first and second mechanical connection elements have first and second guiding pins, the system further comprising at least one circuit board having corresponding first and second apertures for receiving respective guiding pins and wherein the first guiding pins and the first apertures are positioned so that the first end-portions of the optical fibres are positioned in the first predetermined positions when the first guiding pins are received by the first apertures and wherein the second guiding pins and the second apertures are positioned so that the second end-portions of the optical fibres are positioned in the second predetermined positions when the second guiding pins are received by the second apertures.

16. An electronic circuitry comprising at least one optical element, the or each optical element having electric contacts and the electronic circuitry further comprising:
a metallic substrate or layer on which the or each optical element is positioned,
an insulating layer positioned over portions of the metallic substrate and adjacent at least one side portion of the or each optical element;
electrically conductive layer portions electrically connected to the, or a respective, optical element, the electrically conductive layer portions overlapping the insulating layer and extending away from the, or a respective, optical element so that electrical connection of the or each optical element can be achieved by contacting the electrical conductive layer portions at a location that is remote from the or each optical element.

17. A high speed optical connection component, comprising:
a solid state laser component for emitting a modulated beam of light in response to an applied electrical signal;
an optical lens positioned relative to the solid state laser component at a position in which the optical lens reduces in use divergence of the emitted beam of light, the optical lens being formed on a portion of the solid state laser component and at the predetermined position in a manner such that the optical lens is immobile relative to the solid state laser component;

an optical fibre having a core, the optical fibre having first and second end-portions, the first end-portion being positioned for coupling the modulated light from the optical lens into the core;

a receiver for receiving the modulated light from the second end-portion of the optical fibre and arranged for converting the modulated light into a corresponding electrical signal;

at least one circuit board having first and second apertures; and first and second mechanical connection elements which are movable relative to the at least one circuit board, the first mechanical connection element being arranged for holding the first end-portion of the optical fibre in a first predetermined position and the second mechanical connection element being arranged for holding the second end-portion of the optical fibre in a second predetermined position, the first and second mechanical connection elements having first and second guiding pins, respectively, which are arranged for being received by the first and second apertures, respectively, of the at least one circuit board;

wherein the first guiding pin and the first aperture are positioned so that the first end-portion of the optical fibre is positioned in the first predetermined position when the first guiding pin is received by the first aperture and wherein the second guiding pin and the second aperture are positioned so that the second end-portion of the optical fibre is positioned in the second predetermined position when the second guiding pin is received by the second aperture, and wherein the first predetermined position is selected so that the modulated light can be coupled from the solid state laser component into the optical fibre without substantial coupling losses and the second predetermined positions is selected so that the modulated light can be coupled from the optical fibre into the receiver without substantial coupling losses.

18. A high speed optical connection component, comprising:

a solid state laser component for emitting a modulated beam of light in response to an applied electrical signal;

an optical lens positioned relative to the solid state laser component at a predetermined position in which the optical lens reduces in use divergence of the emitted beam of light, the optical lens being formed on a portion of the solid state laser component and at the predetermined position in a manner such that the optical lens is immobile relative to the solid state laser component;

an optical waveguide having a core for guiding the light, the optical waveguide having first and second end-portions, the first end-portion being positioned for coupling the modulated light from the optical lens into the core;

a receiver for receiving the modulated light from the second end-portion of the optical waveguide and arranged for converting the modulated light into a corresponding electrical signal; and a metallic substrate or layer on or over which the solid state laser component is positioned.

19. A high speed optical connection component, comprising:

a solid state laser component for emitting a modulated beam of light in response to an applied electrical signal;

an optical lens positioned relative to the solid state laser component at a predetermined position in which the optical lens reduces in use divergence of the emitted beam of light, the optical lens being formed on a portion of the solid state laser component and at the predetermined position in a manner such that the optical lens is immobile relative to the solid state laser component;

an optical waveguide having a core for guiding the light, the optical waveguide having first and second end-portions, the first end-portion being positioned for coupling the modulated light from the optical lens into the core;

a receiver for receiving the modulated light from the second end-portion of the optical waveguide and arranged for converting the modulated light into a corresponding electrical signal;

an insulating layer adjacent at least one side portion of the solid state laser component; and electrically conductive layer portions electrically connected to the solid state laser component, the electrically conductive layer portions overlapping the insulating layer and extending away from the solid state laser component so that electrical connection of solid state laser component can be achieved by contacting the electrical conductive layer portions at a location that is remote from solid state laser component.

20. The optical connection component of claim 1 wherein the core diameter is 30 µm or less and the distance is less than 200 µm.

21. The optical connection component of claim 1 wherein the core diameter is 30 µm or less and the distance is less than 300 µm.

22. A high speed optical connection component, comprising:

a solid state laser component for emitting a modulated beam of light in response to an applied electrical signal;

an optical lens positioned relative to the solid state laser component at a predetermined position in which the optical lens reduces in use divergence of the emitted beam of light, the optical lens being formed on a portion of the solid state laser component and at the predetermined position in a manner such that the optical lens is immobile relative to the solid state laser component;

an optical waveguide having a core for guiding the light, the optical waveguide having first and second end-portions, the first end-portion being positioned for coupling the modulated light from the optical lens into the core; and a receiver for receiving the modulated light from the second end-portion of the optical waveguide and arranged for converting the modulated light into a corresponding electrical signal;

wherein the core of the optical waveguide has a diameter of 30 µm or less and wherein the optical lens is arranged for reduction of divergence of the emitted laser light in a manner such that substantially low-loss coupling of the emitted laser light into the core of the optical waveguide is possible if the first end-portion of the optical waveguide is positioned within a distance of at least 100 µm from the optical lens.

23. The optical connection component of claim 22 wherein the optical waveguide is an optical fibre.

24. The optical connection component of claim 23 wherein the optical lens and the solid state laser component are monolithically integrated.

25. The optical connection component of claim 23 wherein the optical lens is positioned and arranged so that in use the emitted laser light is substantially collimated by the optical lens.

26. The optical connection component of claim 23 wherein the solid state laser is a vertical-cavity surface-emitting laser (VCSEL) and wherein the receiver is a resonant cavity enhanced photodiode (RCE-PD) and wherein the solid state laser comprises a distributed Bragg reflector (DBR) and the optical lens is formed on an exterior surface of the DBR.

27. The optical connection component of claim 23 wherein the optical connection component comprises a first and a second mechanical connection element, the first mechanical connection element being arranged for holding the first end-portion of the optical fibre in first predetermined position relative to the first mechanical connection element and the second mechanical connection element being arranged for holding a second end-portion of the optical fibre in second predetermined position relative to the second mechanical connection element, wherein the first predetermined position is selected so that light can be coupled from the solid state laser component into the core of the optical fibre without substantial coupling losses and the second predetermined position is selected so that light can be coupled from the core of the optical fibre into the receivers without substantial coupling losses.

\* \* \* \* \*